Aug. 17, 1965 F. G. VON KUMMER 3,201,782

CODE TO CODE CONVERTERS

Filed Nov. 16, 1962 4 Sheets-Sheet 1

INVENTOR
FERDINAND G. von KUMMER

BY Thomas L. Ross
Joseph R. Spalla
ATTORNEYS

INVENTOR
FERDINAND G. von KUMMER
BY Thomas S. Ross
Joseph R. Spalla
ATTORNEYS

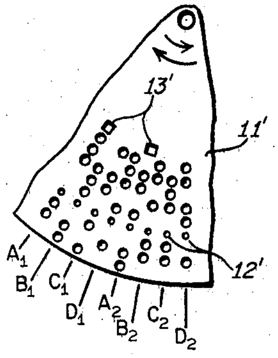
Fig. 6
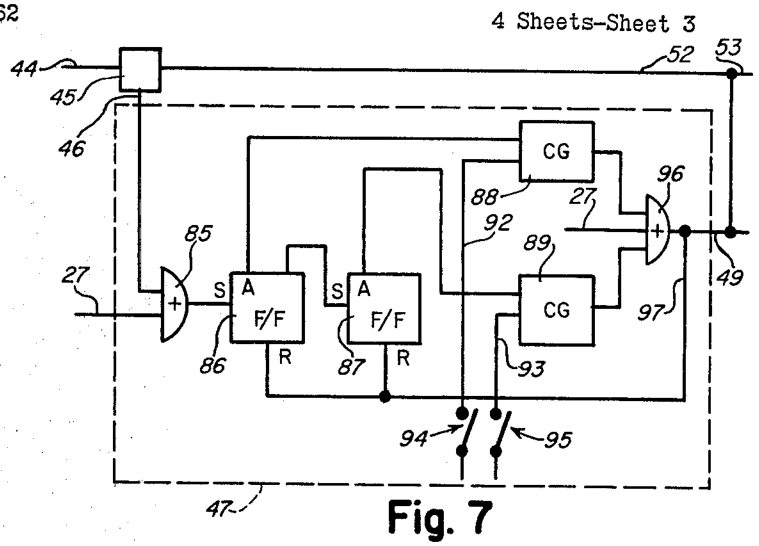
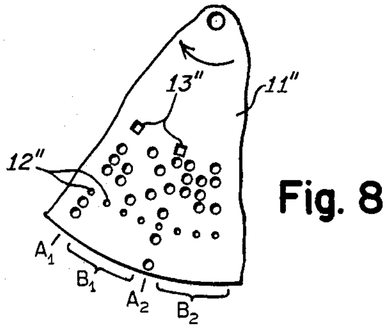
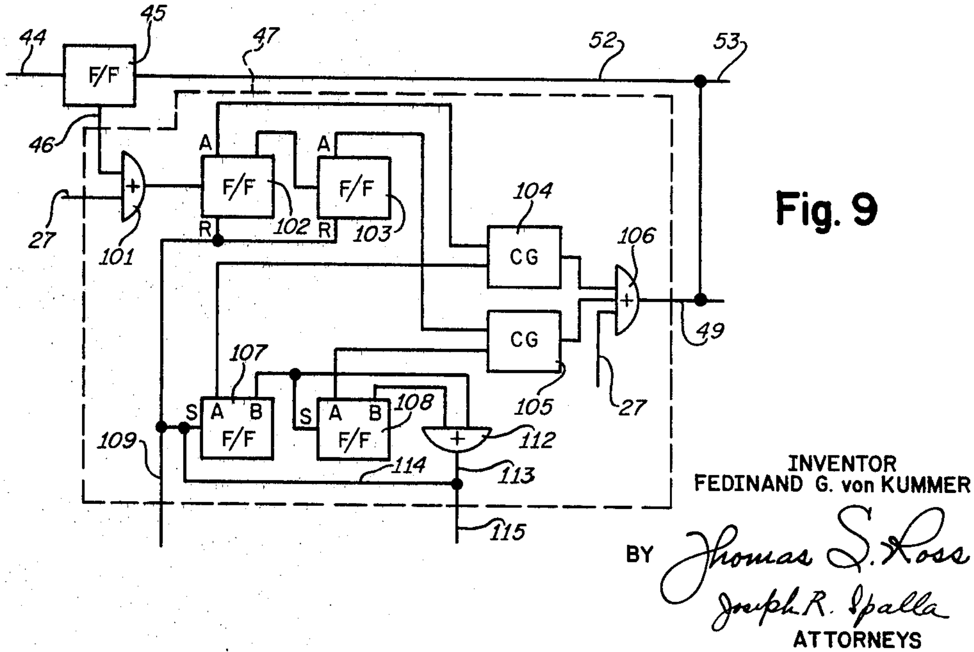
Fig. 9
INVENTOR
FEDINAND G. von KUMMER
BY Thomas S. Ross
Joseph R. Spalla
ATTORNEYS INVENTOR
FERDINAND G. von KUMMER BY Thomas S. Ross
Joseph R. Spalla
ATTORNEYS United States Patent Office 3,201,782
Patented Aug. 17, 1965

3,201,782

CODE TO CODE CONVERTERS

Ferdinand G. von Kummer, Bloomfield, Conn., assignor to Royal McBee Corporation, New York, N.Y., a corporation of New York Filed Nov. 16, 1962, Ser. No. 238,120
9 Claims. (Cl. 340—347)

This invention relates to code to code converters; more particularly it relates to apparatus for converting $n$ digit codes defining information in accordance with a first system code assignment into $m$ digit codes defining the same information in accordance with another system code assignment wherein $n$ is less than, equal to or greater than $m$; and specifically it relates to code conversion apparatus characterized by an endless record medium having recorded thereon in serial order code groupings of first system codes and other system codes with the codes in each grouping defining the same information.

Heretofore the conversion of first system codes into second system codes, both of which represent the same information, has required the decoding of the first system codes into discrete signals and then steering the discrete signals to the proper inputs of an encoder thereby to effect re-encoding of the discrete signals into second system codes. Such schemes require numerous elements and connections and are quite inflexible in that they are adapted to effect conversion only between two different code systems.

In accordance with the present invention first system to second system code conversions are effected in a very facile manner in the employment of record mediums on which is recorded in serial order code groupings comprising codes of a first system and codes of other systems; the codes in said groupings defining the same information.

Broadly, conversions are effected by continuously driving a record medium, which preferably takes the form of a disc, relative to a transducer whereby the codes on the disc are serially read out. Associated with each first system code in a code grouping is identification indicia which when detected is operative to permit comparisons only between said first system disc codes and first system codes to be converted to other system codes. Upon coincidence of said first system codes, circuitry is conditioned to pass the corresponding other system code read from the disc to a utilization device.

In one embodiment of the invention the code groupings comprise a first and second system code defining the same information. In this embodiment first to second or second to first system code conversions may be accomplished by reversing the rotation of the record disc.

In another embodiment of the invention the code groupings may comprise first, second, third, fourth, etc., system codes whereby conversions between first system codes and corresponding second, third or fourth system codes can be selectively accomplished.

In still another embodiment of the invention the code groupings may comprise a first system code and a second system code that is represented by a series of codes. In this embodiment coincidence of first system codes read from said disc and first system codes to be converted effect the sequential gating of the series of codes of a corresponding second system code to a utilization device.

An object of the invention therefore is in the provision of an economical and versatile code to code converter.

Another object of the invention is to provide a code to code converter which is capable of converting codes defining information in accordance with a first system assignment to codes defining the same information in accordance with a second system assignment and vice versa.

Still another object of the invention is to provide a code to code converter which is capable of converting any $n$ digit code to any $m$ digit code wherein $n$ is less than equal to or greater than $m$ by the simple expedient of changing a record medium in which particular code systems are recorded.

Still another object of the invention is in the provision of a record disc having recorded thereon in serial order a plurality of code groupings each comprising codes of several systems all defining the same information and in the provision of appartus for comparing a code to be converted with a corresponding code on said disc whereby upon coincidence thereof a selected corresponding system code is gated to a utilization device.

Still another object of the invention is in the provision of a record disc having recorded thereon in serial order a plurality of code pairs comprising first and second system codes defining the same information and in the provision of apparatus for detecting coincidence between first system codes to be converted and first system codes read from said disc and vice versa whereby said second (or first) system code corresponding thereto will be gated to a utilization device.

A still further object of the invention is to provide a code or converter for converting binary coded information to binary coded decimal form.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 6 is a partial plan view of a record disc showing code groupings comprising several system codes recorded thereon in accordance with another embodiment of the invention;

FIGURE 7 is a block diagram of logic circuitry associated with the circuitry of FIGURE 2 when utilizing the disc of FIGURE 6;

FIGURE 8 is a partial plan view of a record disc having code groupings comprising a first system code and a series of codes representing the same information in a second system code recorded thereon;

FIGURE 9 is a block diagram showing logic circuitry associated with the circuitry of FIGURE 2 when utilizing the disc of FIGURE 8;

Figure 1:
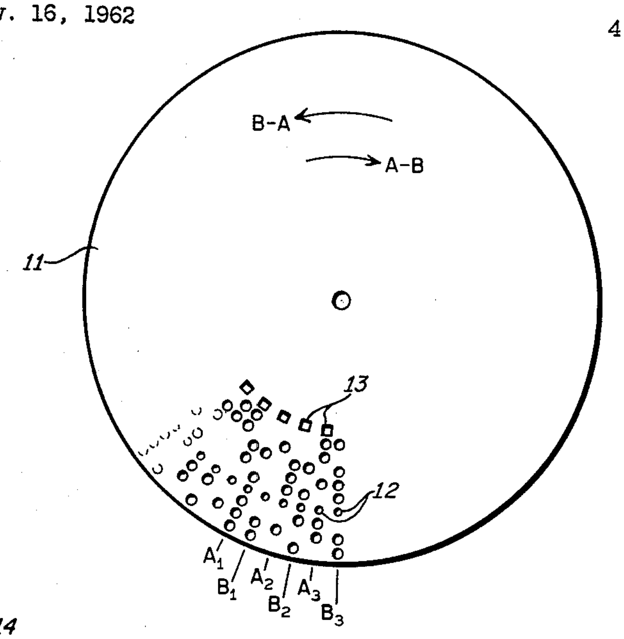
FIGURE 1 is a plan view of a record in the form of a disc showing code groupings comprising first and second system codes recorded therein in accordance with one embodiment of the invention.

Referring now to the drawings wherein like reference numerals represent like or corresponding elements throughout the several views there is shown in FIGURE 1 a record medium in the form of a disc 11. Disc 11 has recorded on equi-spaced radial lines parallel bit combinational codes. In this embodiment alternate radial lines bear codes defining data in accordance with first and second system code assignments. First system codes are designated by reference character A and second system codes by reference character B. In accordance with the invention adjacent codes $A_1B_1$, $A_2B_2$, etc., are representative of the same data.

In the embodiments chosen for purposes of illustration bits are represented by the presence or absence of perforations in the disc but it is to be understood that they may be represented by the presence or absence of magnetized or conductive areas as well.

Recorded with each code is an index or strobe hole 12 which is employed in the invention for timing purposes as will hereinafter become apparent. In addition each of the A codes (or B codes) includes an identification hole 13 to enable the circuitry to distinguish between A and B codes.

Figures 2, 3:
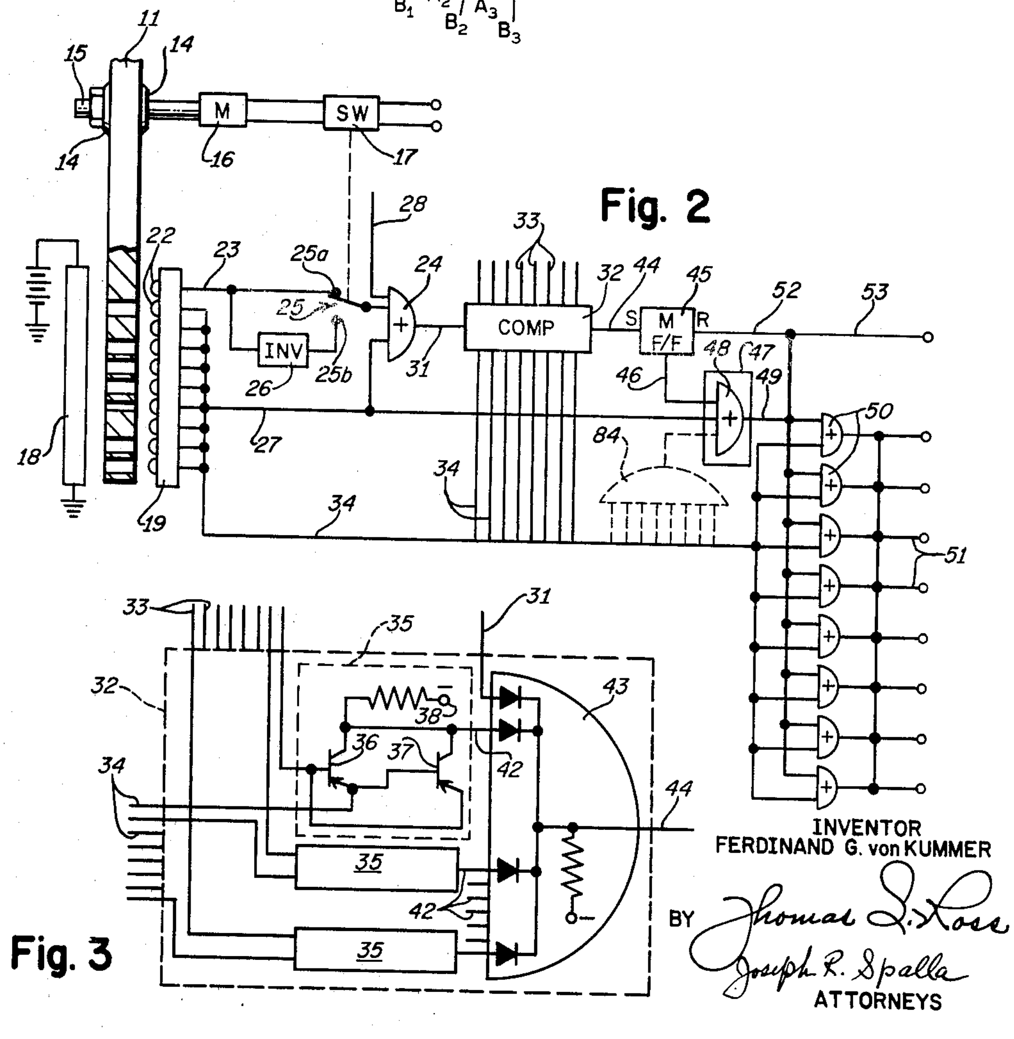
FIGURE 2 is a block diagram of converter apparatus.
FIGURE 3 is a detail schematic view of the comparator shown in FIGURE 2.

The record disc 11, as is shown in FIGURE 2, is adapted to be removably mounted as by clamps 14 to a shaft 15 to permit various discs as required for a particular conversion to be employed. As shown in FIGURE 2 the shaft 15 is adapted to be driven at any selected speed in a clockwise or counterclockwise direction by a motor 16 under the control of a reversing switch 17. Associated with an operatively mounted disc 11 and on opposite sides thereof respectively is a light source 18 and a photoelectric transducer assembly 19. The transducer assembly comprises a plurality of photoconductive cells 22, one corresponding with each bit position track of the codes, one corresponding with the index or strobe hole track, and one corresponding with the identification hole track. With particular reference to FIGURE 2, the output line 23 from the cell associated with the identification hole track is adapted to be connected to one input of a three input diode positive OR or negative AND gate 24 via the upper contact **25*a* of a switch 25 ganged to the motor reversing switch, when A to B conversions are desired, and via an inverter 26 through the lower contact 25*b* of switch 25 when B to A conversions are desired. The output line 27 from the cell associated with the index hole track is also connected to one input of the AND gate 24. The third input is coupled to a line 28 for reasons as will hereinafter appear and whose normal state is such that the AND gate 24** is conditioned to pass a strobe signal provided an identification indicia is detected.

Assuming the switches are in the A to B convert position shown, with the disc driven clockwise as viewed in FIGURE 1, the output line 31 from AND gate 24 will go true or negative each time an identification hole is detected since line 28 is normally true. In the B to A convert position the output line of the AND gate 24 will go true when no identification hole is detected. The output line 31 from AND gate 24 is connected to a comparator circuit 32 such that the comparator is enabled only during times when disc recorded A (or B) codes are being detected by the transducer assembly and over the interval of the strobe pulse generated on line 27.

Also connected to the comparator circuit are lines 33 which are adapted to be energized in accordance with an A system code bit signal combination to be converted to a B code representative of the same information, and lines 34 from the cells associated with the bit positions on disc 11. Hence assuming an A to B conversion, the comparator circuit is conditioned to compare the A code on lines 33 only with the A codes successively read from the disc 11 as it is driven clockwise.

With reference to FIGURE 3 the comparator circuit 32 may comprise a plurality of bit coincidence detectors 35, one associated with each bit position of the A codes.

Each bit coincidence detector may comprise a pair of PNP transistors 36 and 37 whose collectors are connected to a common supply source 38. Each bit signal line 33 is connected to the base of transistor 36 and the emitter of transistor 37 of an associated detector and each corresponding bit line 34 is connected to the base of transistor 37 and the emitter of transistor 36 of an associated detector. The output line 42 of each detector which is connected to the common collector terminal will be negative or true if neither transistor is conductive and positive if either is conductive. One or the other transistor in a bit detector 35 will be conductive when the signals on associated bit lines differ; neither will be conductive when the bit signal levels coincide. As shown in FIGURE 3 the output lines 42 of all the bit coincidence detectors are connected to individual inputs of a diode negative AND gate 43 as is the output line 31 from AND gate 24. If all the inputs to AND gate 43 are negative, the output line 44 of AND gate 43 which is the comparator output, will be true or negative; if any are positive i.e. if any bit detector output is not true or if the output of AND gate 24 is not true, the comparator output will be false or positive.

Referring again to FIGURE 2 the comparator output line 44 is connected to the set line of a memory flip flop 45 which is operative to set condition in response to the trailing edge of the comparator true signal. When the disc of FIGURE 1 is employed a control circuit 47 which may take the form of a two input diode negative AND gate 48 is employed. The output of the memory flip flop 45 is connected via line 46 to one input of the two input diode negative AND gate 48 and the strobe line 27 is connected to the other input thereof so that when the next strobe pulse following the setting of memory flip flop 45 and which is associated with a B code on the disc is generated, it will pass the now conditioned AND gate 48. The output from control circuit 47, i.e. AND gate 48, is coupled via line 49 to each of a plurality of bit negative AND gates 50 thereby conditioning them to pass the B code bit signals on lines 34 simultaneously generated with the strobe pulse passed by gate 48, to output lines 51 which are connected to a utilization device as will hereinafter appear. Line 49 is also connected over line 52 to the reset terminal of memory flip flop 45 which resets in response to the trailing edge of the strobe pulse passed by control circuit 47; line 49 is also connected to a line 53 for reason which will be readily apparent.

Figure 4:
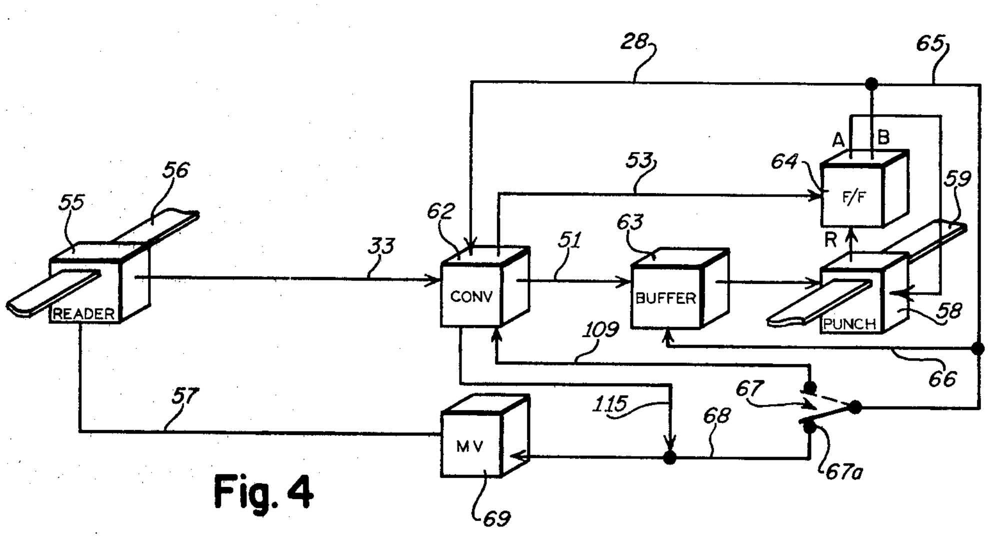
FIGURE 4 is a block diagram of an exemplary system with which the converter apparatus of FIGURE 2 may be employed.

FIGURE 4 shows an exemplary system with which the converter described above may be associated for converting A (or B) system codes to B (or A) system codes. The system comprises a reader unit 55 adapted to generate bit signals on lines 33 in accordance with bit patterns recorded on a tape 56 in response to and for as long as a start search or command line 57 carries a positive signal. When the line 57 goes negative as will hereinafter appear, the reader is operative to feed the tape 56 one increment whereby bit signals corresponding to the succeeding code pattern may be generated on lines 33 when command line 57 is again rendered positive. A reader unit operative as described above may be similar in all respects to the reader disclosed in copending application Serial No. 166,997, filed January 18, 1962, with the exception that the feed control flip flop therein will be adapted to be set in response to the negative going trailing edge of the command signal rather than to the leading edge of the command signal as disclosed in said application. As will be evident presently, command line 57 is normally positive and remains so until B system codes on lines 51 corresponding to the A system code on lines 33 have committed punches in a punch unit 58 to perforate a second tape 59. As hereinbefore disclosed, the converter of FIGURE 2, which is represented by block 62 in FIGURE 4, will generate a B code signal pattern on lines 51 corresponding to the A code signal pattern on lines 33. The output lines 51 are connected to associated flip flops in a buffer unit 63 whereby bit signals are stored until processed by punch unit 58 which is connected to the output lines of the buffer unit. The punch unit 58 may be identical to that disclosed in copending application 199,510, filed June 1, 1962, now Patent No. 3,140,044. The converter output line 53 as shown in FIGURE 4 is after inversion in an inverter (not shown) connected to the set terminal of a flip flop 64, designated a feed control flip flop in said copending application 199,510, whereby the feed control flip flop is set by the leading edge of the converter output signal on line 53. As disclosed in said application, the A output terminal of the feed control flip flop 64 cycles the punch unit 58 whereby record 59 is perforated and fed. The other or B output of the flip flop is connected to input line 28 of AND gate 24 in the converter whereby no further comparisons may be made while the code stored in buffer unit 63 is being processed. This is necessary as the disc speed may be such that it makes several revolutions before the punch unit processes the B code.

As disclosed in Patent No. 3,140,044, the flip flop 64 is reset after the punches have been committed to perforate record 59. The B output of flip flop 64 is also connected via line 65 to the reset line 66 of buffer unit 63 whereby when flip flop 64 resets the negative going signal on line 65 will reset the buffer flip flops. Line 65 is also connected via switch contact 67a of switch 67 to a line 68 which is in turn connected to the trigger terminal of a one shot multivibrator 69. Multivibrator 69 is adapted to be triggered in response to the negative going edge of the signal or line 65 whereby when it is triggered the command line 57 connected to its output will go negative. As hereinbefore stated when line 57 goes negative the reader is cycled whereby tape 56 is indexed. At the end of the multivibrator period the command line 57 will again be positive and the succeeding code pattern on tape 56 will be generated on lines 33.

Figure 5:
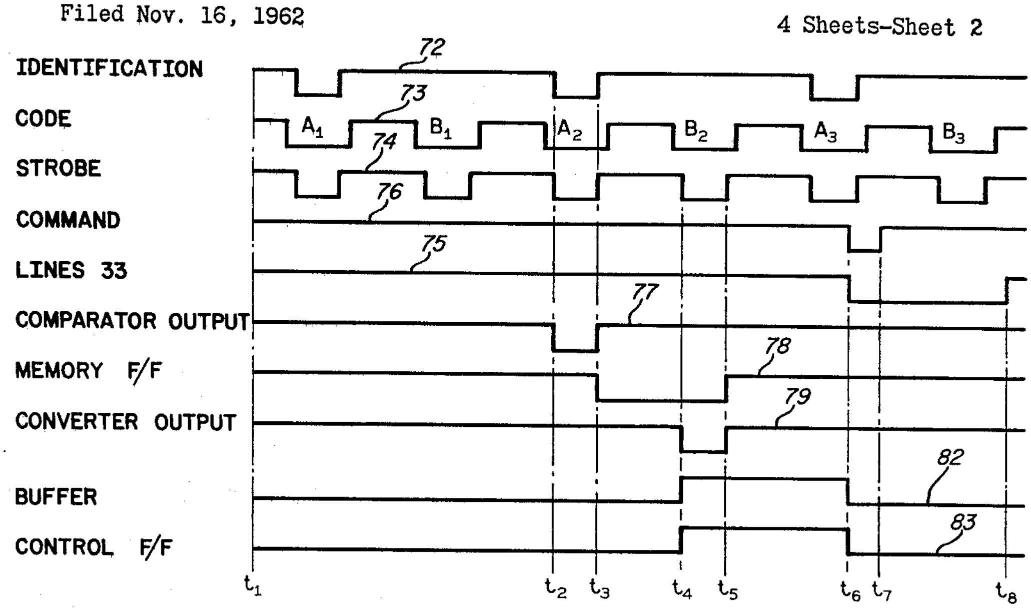
FIGURE 5 is a timing diagram explanatory of the operation of the invention in the system of FIGURE 4.

The operation of the converter in the system of FIGURE 4 may be understood more clearly by reference to the timing diagram of FIGURE 5 wherein curve 72 shows the frequency of the signals generated by the identification mark detector, curve 73 shows the frequency of the signals generated by the bit detectors and curve 74 the frequency of signals generated by the index mark detector. Assuming an A to B conversion and that at time $t_1$ the single shot multivibrator 69 is in quiescent state, command line 57 will effect the generation by the reader of bit signals corresponding to the code sensed from the tape 56 on lines 33. The code signals on lines 33 as shown by curve 75 will persist over the command interval illustrated by curve 76.

As hereinbefore stated the AND gate 24 will condition the AND gate 43 in the comparator 32 only during intervals in which A codes are being sensed from the disc 11, hence assuming the $A_2$ code is on lines 33, when the code $A_2$ is read from the disc 11, all the inputs to AND gate 43 will be true whereby an output on line 44 will be generated over the strobe interval $t_2$–$t_3$ as shown by curve 77. The trailing edge of the comparator output signal is employed to set the memory flip flop 45 at time $t_3$ thereby conditioning AND gate 48 over its set interval $t_3$–$t_5$ (curve 78) whereby the next strobe signal following the setting of flip flop 45 is passed by AND gate 48 thereby conditioning bit gates 50 over the $B_2$ strobe interval $t_4$–$t_5$ (curve 79) which thereby pass the $B_2$ code via lines 51 to the buffer unit 63; and via line 53 to the punch unit feed control flip flop 64 thereby setting them at time $t_4$ as shown by curve 82 and 83. As stated before the memory flip flop will be reset by the trailing edge of the converter output pulse (curve 79) at time $t_5$. Also as hereinbefore stated the output of the control flip flop 64 will cycle the punch unit 58 which will process the code in buffer unit 63. At time $t_6$, after punches have been committed, the control flip flop will be reset whereupon line 65 will change state (curve 83) thereby resetting buffer unit 63 and via switch 67 and line 68 triggering the one shot multivibrator 69. When the one shot multivibrator is triggered, the command line 57 connected to its output will go negative for a time, e.g. $t_6$–$t_7$, determined by the period of the multivibrator. The negative going command signal will set the reader control flip flop whereby tape 56 will be fed one increment. As the feed interval will usually be longer than the multivibrator period, the next code pattern will be sensed as soon as the reader has completed its feed cycle e.g. at time $t_8$. As is evident no comparisons may be made after coincidence between $A_2$ codes has been detected as the output from the control flip flop 64 maintains AND gate 24 disabled over its set interval $t_4$–$t_6$.

Discs 11 without index holes are also within the purview of the invention. In such an alternative the strobe logic would not be required and timing could be accomplished by connecting all the bit lines 34 to a NOR gate 84 as shown in dotted lines in FIGURE 2. The output of the NOR gate would be connected to the input of AND gate 48 which would pass the NOR gate output pulse only when conditioned by the output from the set memory flip flop which, as before, would be set by the trailing edge of the comparator output pulse. The duration of the comparator output pulse in this case would be that of the identification pulse which may be of the same duration. The duration of the output pulse from AND gate 48 would be that of the code output pulse duration.

Another embodiment of the invention is shown in FIGURES 6 and 7. Referring particularly to FIGURE 6 a disc 11' has recorded thereon code groupings comprising codes of systems A, B, C, and D; identical subscripts designating codes representative of the same data. The codes of one system, e.g. A, are associated with identification holes or indicia 13'. As will hereinafter appear the disc 11' may also be driven in the ABCD or DCBA directions. With reference to FIGURE 2 and FIGURE 7, A system codes presented to input lines 33 (FIGURE 2) may be selectively converted to B, C, or D system codes. Broadly, the operation is the same as described with reference to FIGURES 2 and 5 except that with disc 11' control circuit 47 takes the form of the circuitry shown in FIGURE 7 comprising an AND gate 85 whose output is connected to a binary counter comprising flip flops 86 and 87. The A terminals of the flip flops are connected respectively to an input of a coincidence circuit 88 and to an input of a coincidence circuit 89. The other inputs to the coincidence circuits are connected to lines 92 and 93 which include switching elements 94 and 95 whereby numbers 1, 2 or 3 in binary notation may be applied thereover to the coincidence circuits. For example, if 94 is open and 95 closed a binary one is applied to the coincidence input terminals; if 94 is closed and 95 open, a binary two is applied, and if both are closed a binary three is applied. The outputs of the coincidence circuits are connected to a three input AND gate 96; the third input being connected to strobe line 27. The output of AND gate 96 via line 49 is employed as hereinbefore explained with reference to FIGURE 2. If, for example, it is desired to convert A codes to C system codes a binary two would be set in by switches 94 and 95. Hence when the A code to be converted coincides with an A code on the disc, the memory flip flop will be set as before, permitting AND gate 85 to pass strobe pulses. The second strobe pulse will set the counter flip flops 86 and 87 whereby the state of terminals A will represent a binary two. When this occurs both coincidence gate outputs will be true and the output of gate 96 will condition bit gates 50 to pass the C code on the disc to output lines 51. The trailing edge of the output pulse from gate 96 is employed via line 97 to reset the counter flip flops 86 and 87 to zero. A to B or A to D conversion is similarly accomplished by manually setting switches 94 and 95 to binary 1 or 3 respectively.

A third embodiment of the invention is shown in FIGURES 8 and 9. This embodiment is adapted to convert straight binary A system to B system codes where the B system codes are represented by a series of code combinations recorded on disc 11''. While this embodiment finds particular application in converting straight binary coded data to binary coded decimal form, the B codes in a group may collectively represent a word or other interpretive data. In this embodiment the disc 11'' is driven in the clockwise or A–B direction only. Again the operation is the same as described with reference to FIGURE 2 except that in this modification the control circuit 47 takes the form shown in FIGURE 9.

As shown in FIGURE 9, strobe line 27 and memory flip flop output line 46 are connected to an AND gate 101 whose output is connected to a conventional counter comprising flip flops 102 and 103. The A output terminals of the counter flip flops are connected respectively to the input of a coincidence gate 104 and to the input of a coincidence gate 105. The output of the coincidence gates are connected to a three input AND gate 106 with the strobe line 27. The output of AND gate 106 is adapted via line 49 to condition bit gates 50, to reset the memory flip flop on the trailing edge and to set the control flip flop 64 on the loading edge of the pulse on line 49 as before.

The embodiment of FIGURE 9 also includes a second counter comprising flip flops 107 and 108 which normally are set to the count of one (binary). The A output terminals of these flip flops are connected respectively to the other input terminals of coincidence gates 104 and 105 whereby when both counters have the same count, all inputs to the AND gate 106 will be true. For example, upon coincidence of code $A_2$ on disc 11″ with an $A_2$ code to be converted the memory flip flop 45 will be set as hereinbefore explained thereby conditioning AND gate 101 which passes the next following strobe pulse thereby setting counter flip flops 102 and 103 to the count of one; and as counter flip flops 107 and 108 are initially set to the count of one, the outputs of coincidence gates 104 and 105 will be true so that AND gate 106 will pass the first strobe pulse following the setting of memory flip flop 45 thereby enabling bit gates 50 to pass the first code combination of the B code. The trailing edge of the pulse on line 49 resets memory flip flop 45 as before.

The first $B_2$ code combination will be processed and the trailing edge of the process signal on line 65 (FIGURE 4) is employed via line 66 to reset buffer unit 63 as before. In this embodiment, however, referring to FIGURE 4, the process signal on line 65 is not coupled directly to the multivibrator 69 as before but rather via transferred switch 67 to a line 109 which, as shown in FIGURE 9, is connected to reset counter flip flops 102 and 103 to zero and to set counter flip flops 107 and 108 to the count of two. As multivibrator 69 is not triggered the reader does not feed but continues to emit the $A_2$ code. The next time the $A_2$ code coincides with the $A_2$ disc code the memory flip flop 45 will again be set and thereby permit strobe pulses to pass AND gate 101. When two strobe pulses pass, both counters will again have the same count and AND gate 106 will again pass a strobe pulse to effect the processing of the second $B_2$ code combination following the coincident $A_2$ code. After processing, the process signal zeros flip flops 102 and 103 once again and sets a three in counter flip flops 107 and 108. Upon continued rotation of disc 11″ coincidence will again be detected and the memory flip flop 45 will again be set. As a count of three is now in counter flip flops 107 and 108, three strobe pulses must pass gate 101 before AND gate 106 opens and thereby permits processing of the third $B_2$ code combination. After processing the third $B_2$ code combination, the in process signal on line 65 via line 109 will reset counter flip flops 102 and 103 to zero and set counter flip flops 107 and 108 back to zero. As shown in FIGURE 9 the B terminals of counter flip flops 107 and 108 are coupled to the inputs of an AND gate 112 whose output line 113 changes state when flip flops 107 and 108 are set back to zero. The change in state of output line 113 is employed over line 114 whereby the leading edge thereof sets a one in counter flip flops 107 and 108. Line 113 is also connected via line 115 to thereby trigger one shot multivibrator 69 whereby the reader unit may be cycled to generate another A code to be converted.

Figure 10:
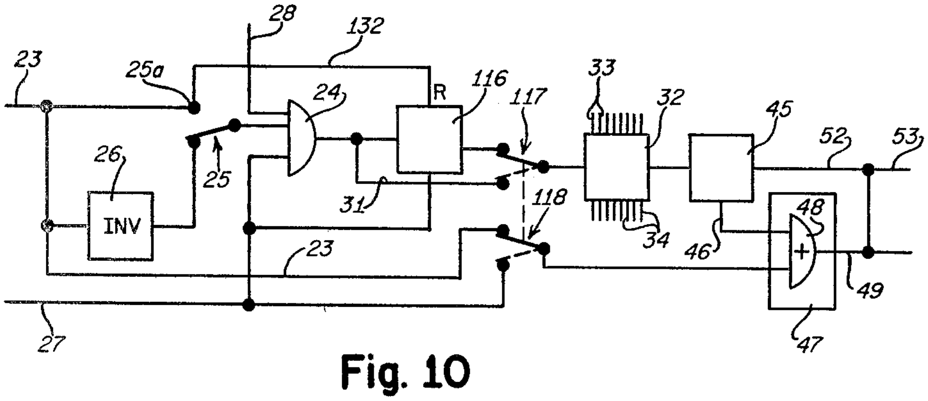
FIGURE 10 is a block diagram of a converter incorporating further circuitry.
Figure 11:
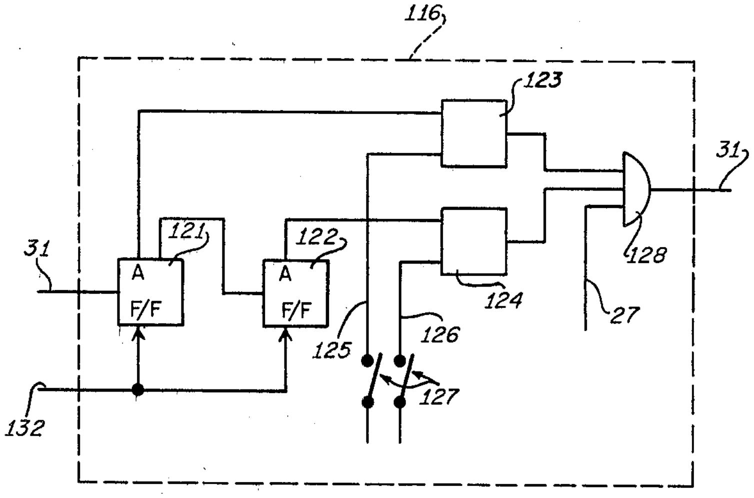
FIGURE 11 is a block schematic of circuitry incorporated in FIGURE 10.

Referring now to FIGURES 10 and 11 there is shown incorporated in the FIGURE 2 converter, circuits to permit the disc of FIGURE 6 to be driven in a counterclockwise direction to effect B, C, or D to A code conversions. These incorporated circuits include a counter-coincidence detector 116 which is more specifically shown in FIGURE 11 and which is adapted to be connected between AND gate 24 and comparator 32 by means of switch 117 which is shown in the counterclockwise convert position. Further, as shown in FIGURE 10, the output line 23 rather than strobe line 27 is adapted to be connected to control circuit 47 by means of a switch 118 which also is shown in the counterclockwise convert position. As is evident when switches 117 and 118 are in dotted line positions or ABCD convert positions the converter will be identical to that of FIGURE 2. With reference to FIGURE 11 the counter-coincidence circuit 116 comprises flip flops 121 and 122. The A terminals of the flip flops are connected respectively to an input of coincidence circuits 123 and 124. The other inputs to the coincidence circuits are connected to lines 125 and 126 which include switching elements 127 whereby numbers in binary notation may be set up as hereinbefore explained. The output of the coincidence circuits are connected to the inputs of an AND gate 128 as is strobe line 27. The output of AND gate 128 is adapted to enable the comparator circuit as hereinbefore explained. With the counter 116 connected in the converter and with switch 25 set in the counterclockwise position, the absence of identification indicia will permit gate 24 to pass strobe pulses to counter 116. When the number of strobe pulses passed by gate 24 equals the number set in by switches 127 the comparator will be enabled to make a comparison. If no comparison is made the counter is reset to zero by the signal on lines 23 and 132 generated in response to the next detected identification hole. If, however, a comparison is made the memory flip flop will be set as before and when the next following identification hole is detected, it will pass now conditioned gate 48 whereby the A code corresponding to the B, C, or D code will be passed by bit gates 50 and processed. To better understand the operation of the FIGURE 10 circuit assume that the reader generated a $C_1$ code to be converted to an $A_1$ code and assume further that the $D_2$ code (FIGURE 6) was passing the transducer. Since a C to A conversion is desired a count of two would be set in counter circuit 116. In the absence of identification holes the strobe pulses generated with the $D_2$ and $C_2$ codes would set a two in counter flip flops 121 and 122 which would coincide with the set count whereby gate 128 would generate an output pulse to enable the comparator. The $C_1$ code input however would not compare with the $C_2$ disc code with the result that memory flip flop 45 would not be set and hence gate 48 would not be conditioned to pass the next identification pulse associated with the $A_2$ code. The counter would meantime have gone to 3 when the $B_2$ code passes and have been reset to zero by the identification signal generated upon passage of the $A_2$ code. Upon passage of the $D_1$ and $C_1$ codes the comparator would again be enabled and this time comparison would be made of the input $C_1$ code and the $C_1$ disc code; the memory flip flop would set and gate 48 would be conditioned to pass the identification signal generated with the $A_1$ disc code whereby the $A_1$ code would be passed by bit gates 50.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Apparatus for converting code patterns of one code system to code patterns of other code systems comprising an endless record having a plurality of groups of parallel bit combinational codes serially recorded thereon, each group comprising a first system code and other system codes representing the same data, identification indicia associated with said first system codes, means for driving said record, transducer means periodically generating signals in accordance with the bit patterns of said codes and said identification indicia as said record is driven, a comparator conditionable by and over the interval of said identification signals for generating an output pulse upon coincidence of the bit signal patterns of a recorded first system code and a first system input code, bistable means settable in response to the trailing edge of said comparator output pulse, normally blocked gate means adapted when gated to pass bit signal patterns to a utilization device for processing, control means operative when conditioned by said set bistable means to generate a gate pulse in response to the generation of a following selected code signal pattern in the group including said coincident first system code pattern, and means connecting said gate pulse to said bistable means whereby said bistable means is reset in response to the trailing edge of said gate pulse.

2. Apparatus for converting code patterns of one code system to code patterns of another code system comprising an endless record having a plurality of groups of parallel bit combinational codes serially recorded thereon, each group comprising a first system code and at least one other system code representing the same data, identification indicia recorded with said first system codes, means for continuously driving said record, transducer means for successively sensing and thereby generating signals corresponding to said code patterns as said record is driven relative thereto, means for generating a timing pulse with each successively sensed code pattern, transducer means for sensing and thereby generating pulses corresponding to said identification indicia, a comparator, means connecting record generated code signal patterns and first system input code signal patterns to said comparator, means responsive to said identification pulses for enabling said comparator during intervals of generation of recorded first system code signal patterns whereby upon coincidence of signals corresponding to a recorded and an input code pattern an output pulse is generated, bistable means settable in response to the trailing edge of said comparator output pulse, gate means adapted when gated to pass record generated code signal patterns, gate control means responsive to the output of said set bistable means and to said timing pulses for generating gate pulses, means for applying said gate pulses to said gate means whereby the record generated signal pattern corresponding to said other system code in the code grouping containing the coincident code is passed to a utilization device for processing, means for applying said gate pulse to said bistable means to reset the latter at the termination of said gate pulse to thereby block the gating of subsequently generated timing pulses, and means for disabling said comparator during the processing of said gated code signal pattern.

3. Apparatus as recited in claim 2 wherein said means for generating timing pulses includes timing indicia recorded with each code, and transducer means for sensing said timing indicia.

4. Apparatus as recited in claim 2 wherein said means for generating timing pulses comprises a NOR gate connected to the output of said code pattern transducers.

5. Apparatus as recited in claim 2 wherein said gate control means comprises a counter operative in response to timing pulses generated subsequent to the setting of said bistable means, means for comparing the number in said counter with a preset number, and means responsive to coincidence between the number in said counter and said preset number for generating a gate pulse thereby to gate the signal pattern corresponding to a code in the group containing the coincident code which is removed from the coincident code a number of increments equivalent to said preset number.

6. Apparatus as recited in claim 2 wherein said other system code comprises a series of codes and wherein said gate control means comprises a first counter operative in response to timing pulses generated subsequent to the setting of said bistable means, a second counter normally set to a count of one, means for generating a gate pulse upon coincidence of the numbers in said counters whereby the signal patterns corresponding to the first code in the series associated with the coincident code is passed to a utilization device for processing and said bistable means is reset, means responsive to the processing of the code signal pattern passed to said utilization device for zeroing said first counter and for increasing the count by one increment in said second counter, whereby upon generation of two timing pulses subsequent to the resetting of said bistable means, coincidence of the count in said counters is detected and a second gate pulse is generated, thereby to pass the signal pattern corresponding to the second code in the series associated with the coincident code to said utilization device for processing.

7. Code converter apparatus comprising an endless record having serially recorded thereon code groupings, each code grouping comprising a first system parallel bit code and at least one second system parallel bit code defining the same information as said first system code, indicia distinguishing said first and second system codes, transducers for sensing said codes and indicia, means for continuously driving said record relative to said transducers thereby to generate signals corresponding to said recorded codes and indicia, means conditioned by indicia signals distinguishing said first system codes for comparing for coincidence first system input code signals and transducer generated first system code signals and for generating a signal upon coincidence thereof.

and control means operative when conditioned by a coincidence signal to gate transducer generated signals corresponding to the second system code in the coincident code grouping to a utilization device.

8. Code converter apparatus for converting any one of several system codes to a first system code, all of said codes defining the same data comprising, an endless record having serially recorded thereon code groupings each of which includes a first system parallel bit code and several other system parallel bit codes, indicia distinguishing said first and other system codes, transducers for sensing said recorded codes and indicia, means for driving said record relative to said transducers thereby to generate in order signals corresponding to said other system codes and said first system codes and to generate indicia signals associated with said codes, means adapted to compare input parallel bit code signals with transducer generated signals and to generate a signal upon coincidence thereof, selecting means conditioned by indicia signals distinguishing said other system codes, said selecting means being further conditionable and operable to enable said comparing means only during the intervals of generated signals corresponding to a selected one of said other system codes, and gate means operative in response to said coincidence signal and to indicia signals distinguishing the first system codes for passing transducer generated signals corresponding to the first system code in the coincident code grouping to a utilization device for processing.

9. Code converter apparatus comprising an endless record having serially recorded thereon code groupings, each code grouping comprising a first system parallel bit code and a parallel bit code of at least one other system defining the same information, indicia distinguishing said first and other system codes, transducers for sensing said codes and indicia, means for issuing signals corresponding to a first system parallel bit code to be converted, means conditioned by indicia signals distinguishing said first system recorded codes to compare said issued signals with transducer generated signals corresponding to said first system codes and to generate a coincidence signal, recording means for processing code signals, first control means responsive to coincidence signals and transducer generated signals for gating the transducer generated signals corresponding to the other system code in the coincident code group to said recording means, means responsive to said first control means for cycling said recording means whereby said gated signals are processed, and second control means responsive to said last named means to effect the issuance of subsequent signals to be converted after said gated signals have been processed.

References Cited by the Examiner

UNITED STATES PATENTS

| | | | |
|---|---|---|---|
| 2,784,397 | 3/57 | Branson et al. | 340—347 |
| 2,909,769 | 10/59 | Spaulding | 340—347 |

MALCOLM A. MORRISON, *Primary Examiner.*